(12) United States Patent
Poulsen

(10) Patent No.: US 6,963,816 B1
(45) Date of Patent: Nov. 8, 2005

(54) SYSTEMS AND METHODS FOR INTEGRATED EMISSIVITY AND TEMPERATURE MEASUREMENT OF A SURFACE

(75) Inventor: Peter Poulsen, Livermore, CA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 64 days.

(21) Appl. No.: 10/652,336

(22) Filed: Sep. 2, 2003

Related U.S. Application Data

(60) Provisional application No. 60/409,419, filed on Sep. 4, 2002.

(51) Int. Cl.[7] .......................... G01K 11/30; G06F 15/00
(52) U.S. Cl. ...................................... 702/134
(58) Field of Search .......................... 702/40, 127, 130, 702/134, 85, 99; 374/1, 2, 9, 121, 129, 126, 374/100

(56) References Cited

U.S. PATENT DOCUMENTS

| | | | | |
|---|---|---|---|---|
| 4,924,478 A | * | 5/1990 | Tank | ........................... 374/121 |
| 5,231,595 A | * | 7/1993 | Makino et al. | .............. 702/134 |
| 5,255,286 A | * | 10/1993 | Moslehi et al. | .............. 374/121 |
| 6,299,346 B1 | * | 10/2001 | Ish-Shalom et al. | ......... 374/126 |
| 6,479,801 B1 | * | 11/2002 | Shigeoka et al. | ............ 219/502 |
| 6,682,216 B1 | * | 1/2004 | Small IV et al. | ............ 374/126 |
| 6,733,173 B1 | * | 5/2004 | Huston et al. | ............... 374/121 |
| 2002/0192847 A1 | * | 12/2002 | Ino et al. | ....................... 438/14 |
| 2003/0067956 A1 | * | 4/2003 | Hashimoto et al. | .......... 374/121 |

* cited by examiner

Primary Examiner—Bryan Bui
Assistant Examiner—Demetrius Pretlow
(74) Attorney, Agent, or Firm—William C. Daubenspeck; Dickson Kehl; Paul A. Gottlieb

(57) ABSTRACT

A multi-channel spectrometer and a light source are used to measure both the emitted and the reflected light from a surface which is at an elevated temperature relative to its environment. In a first method, the temperature of the surface and emissivity in each wavelength is calculated from a knowledge of the spectrum and the measurement of the incident and reflected light. In the second method, the reflected light is measured from a reference surface having a known reflectivity and the same geometry as the surface of interest and the emitted and reflected light are measured for the surface of interest. These measurements permit the computation of the emissivity in each channel of the spectrometer and the temperature of the surface of interest.

4 Claims, 9 Drawing Sheets

SYSTEMS AND METHODS FOR INTEGRATED EMISSIVITY AND TEMPERATURE MEASUREMENT OF A SURFACE

CROSS REFERENCE TO RELATED APPLICATIONS

The instant application claims priority from provisional application No. 60/409,419, filed Sep. 4, 2002, the disclosure of which is incorporated by reference herein in its entirety.

GOVERNMENT CONTRACT

The United States Government has rights in this invention pursuant to Contract No. W-7405-ENG-48 between the United States Department of Energy and the University of California for the management and operation of Lawrence Livermore National Laboratory.

FIELD OF THE INVENTION

The present invention relates generally to pyrometry and, more particularly, to systems and methods for implementing pyrometric measurements of simple or complex surfaces of interest.

BACKGROUND OF THE INVENTION

It is relatively easy to measure the radiation spectrum from a target surface. The spectrum itself, however, does not yield information about the temperature without knowledge or information about the emissivity of the surface as a function of wavelength and possibly angle. The emissivity is often assumed to be constant (i.e., the gray body assumption) or to have a prescribed variation with wavelength. However, in actuality, the emissivity can vary strongly and without regularity as a function of wavelength. Hence, a lack of knowledge of the emissivity leads to a large uncertainty in the temperature obtained from the radiation measurement. In some present applications, the emitted light is compared to a surface having a known temperature, however, the validity of this comparison hinges on the assumption that the surface being measured and the reference temperature have the same emissivity.

SUMMARY OF THE INVENTION

Systems and methods consistent with the present invention add a measurement of reflected and/or incident light to the information used to determine surface emissivity and temperature. Either knowledge of the spectrum of the incident light, or a measurement of the light reflected from a known surface in addition to a measurement of the emitted and the sum of the emitted and the reflected light from the subject surface, allow the computation of the emissivity as a function of wavelength and the temperature of the surface. One feature of the present invention is that it does not use absolute values of the measurement. Instead, it uses relative values between channels. The use of relative values cancels out geometry factors and eliminates the need for absolute calibrations. Another feature of the present invention is that it is fast enough to be applied to rapidly moving or changing surfaces, such as surfaces of materials that are deformed or shocked by a high pressure impact or explosive. A further feature of the present invention is that the fiberoptics for the sensors and fiberoptics for the incoming light are located very nearly at the same point in space to automatically correct for the angle of dependence of the emissivity. An example of application of the method to a small and uniform spatial area at one point in time may be given by describing an experiment in which a flat plate is shocked. The method can easily be replicated both in space and time to produce a record of temporal and spatial variations in temperature by usings arrays of sensors, such as can be provided by digital video cameras.

Other advantages and features of the present invention will become readily apparent to those skilled in this art from the following detailed description. The invention is capable of modifications in various obvious respects, all without departing from the invention. Accordingly, the drawings are to be regarded as illustrative in nature, and not as restrictive.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
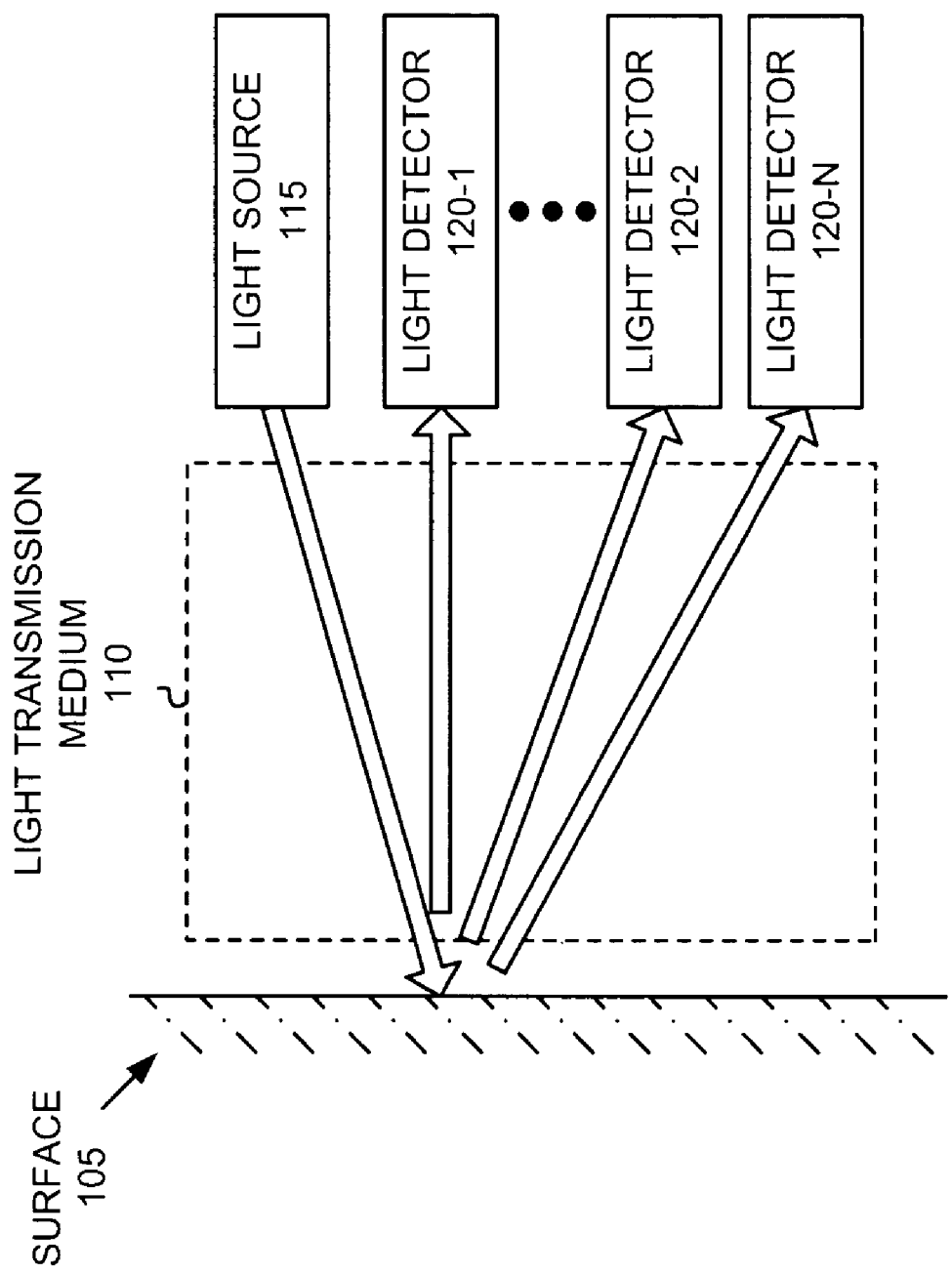
FIG. 1 illustrates an exemplary system for measuring the emissivity and temperature of a surface consistent with the present invention.

FIG. 1 illustrates an exemplary surface emissivity and temperature measurement system 100 consistent with the present invention. System 100 may measure the temperature and emissivity of any object or surface using emitted and reflected light from a small area of the object or surface. System 100 may include a surface 105, a light transmission medium 110, a light source 115 and multiple light detectors 120-1 through 120-N. Surface 105 may include any type of simple or complex surface such, for example, a room, people, the ground, etc. Light transmission medium 110 may include any type of medium for conveying light from light source 115 to surface 105, and from surface 105 to light detectors 120-1 through 120-N. Light transmission medium 110 may include, for example, one or more optical fibers, lenses, etc. Light source 115 may include any type of pulsed light source such as, for example, a xenon high pressure lamp with a sapphire window. One skilled in the art will recognize, however, that other pulsed light sources may equivalently be used. Each of light detectors 120-1 through 120-N may include a device for measuring the intensity of light over a given wavelength range (i.e., a channel), such as, for example, a spectrometer or a still or video digital camera. Light detectors 120-1 through 120-N, and light source 115, may be aimed to cover the same small area of surface 105. Though not shown in FIG. 1, an array of light sources 115 and light detectors 120 may be arranged to produce a temperature map of complex surfaces or objects having different temperatures and emissivities over their surfaces.

Light detectors 120-1 through 120-N may be aimed to cover the same small area of a surface or object and the emitted light from the surface or object may be measured. Light source 115 may then be activated such that light detectors 120-1 through 120-N may measure the sum of the emitted and reflected light from the surface or object. The emissivity and temperature of the small area covered by light detectors 120-1 through 120-N may then be calculated. In some exemplary implementations, light source 115 can be continuously pulsed to give a continuous reading of a temperature of surface 105. System 100 may, thus, be replicated in time by pulsing light continuously, and in space by using an array of light detectors 120. Light detectors 120-1 through 120-N may be flashed on and off at a frequency related to the desired time resolution of the temperature measurement, so that (after processing the data) a continuous record of the temperature distribution of a surface or object as a function of time may be obtained.

If light detectors 120-1 through 120-N include cameras, a bandpass filter may be place in from of each camera so that each camera only measures a portion of the light spectrum. System 100 may use at least three cameras, each having a different bandpass filter. All of the cameras may be aimed to cover the same surface or object and the light emitted from the object may be measured. Light source 115 may then be activated and the cameras may measure the sum of the emitted light and the reflected light. Using the measured emitted and reflected light, the emissivity and temperature of each small area covered by a pixel in each of the three cameras may be calculated.

Figure 2:
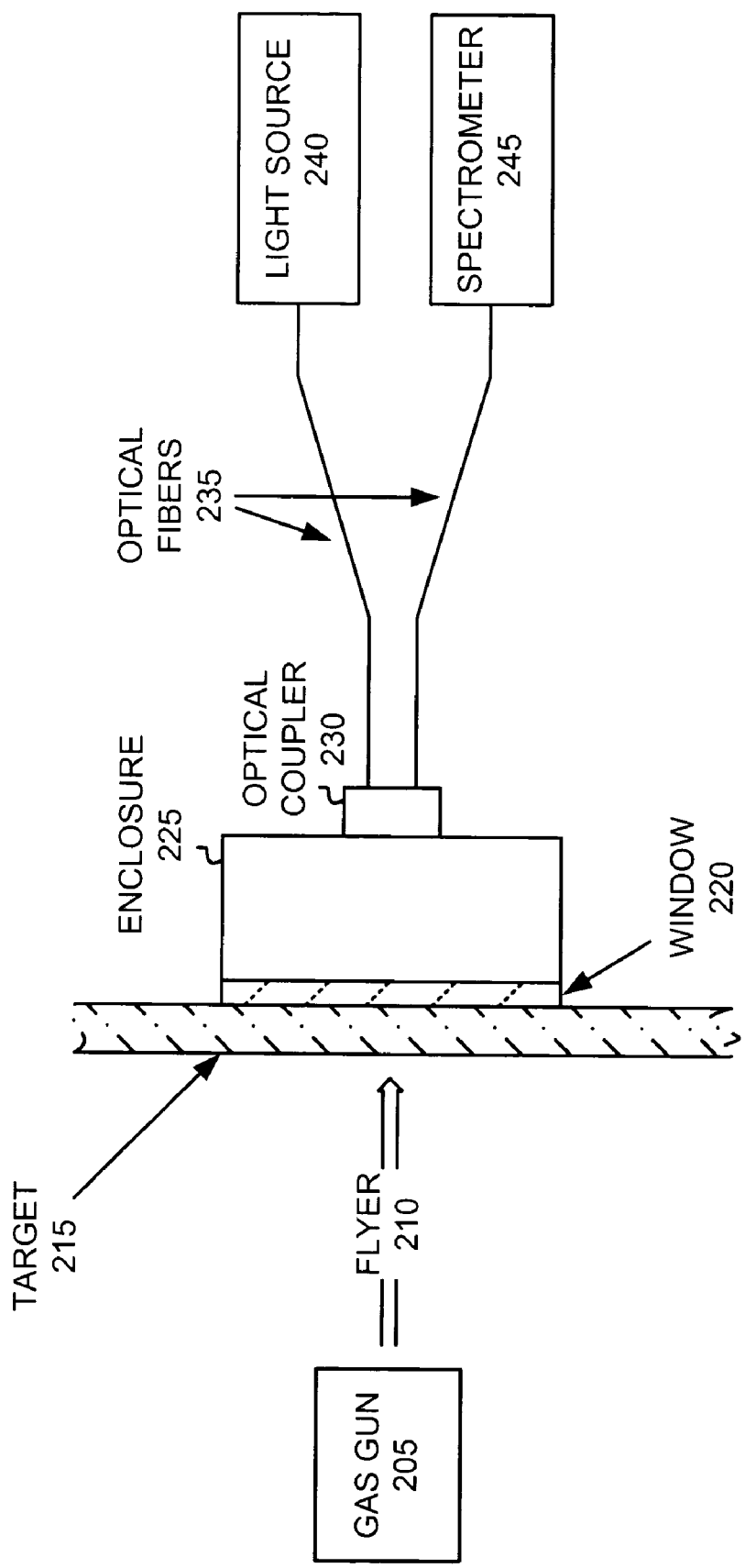
FIG. 2 illustrates an exemplary implementation of the system of FIG. 1 that measures the emissivity and temperature of a shocked surface consistent with the present invention.

FIG. 2 illustrates a specific application 200 of system 100, consistent with the present invention, for measuring the emissivity and temperature of a shocked surface. System 200 may include a gas gun 205, a flyer 210, a target 215, a window 220, an enclosure 225, an optical coupler 230, optical fibers 235, a light source 240 and a spectrometer 245. Gas gun 205 may include conventional driving mechanisms for driving flyer 210 to a predetermined velocity (e.g., 3 km/s) to impact target 215. Flyer 210 may include a high density material such as, for example, copper, though other high density materials may be used. Target 215 may include, for example, a plate of material that serves as a target for flyer 210 when driven by gas gun 205. Target 215 may include, for example, a plate of polished molybdenum (though other materials may be used) having a thickness of approximately 6 mm. Target 215 may be backed by window 220 that may include a sheet of, for example, lithium fluoride crystal. Window 220 may serve to increase the pressure at the interface between target 215 and window 220 relative to a completely released condition. Window 220 may further prevent the creation of ejected micro-particles at the surface of target 215 when flyer 210 impacts target 215.

Enclosure 225 may completely enclose the impact point of the flyer 210 upon target 215, including enclosing window 220. Enclosure 225 may include a cavity with a non-reflecting surface, such as, for example, a cavity darkened by soot to minimize reflections. Enclosure 225 may include a "light tight" cavity in which the only entry or egress of light into enclosure 225 is through optical coupler 230. Optical coupler 230 may include a conventional coupling device for connecting the fibers from detectors (not shown) in spectrometer 245 and from light source 240 through enclosure 225. Optical fibers 235 may serve as an optically transmissive medium for conveying light to enclosure 225 from light source 240 and from a surface of target 215 to detectors in spectrometer 245. Light source 240 may include a pulsed light source such as, for example, an xenon high pressure lamp with a sapphire window. One skilled in the art will recognize, however that other pulsed light sources may equivalently be used. Spectrometer 245 may include multiple channels for detecting and measuring signals with specified optical wavelengths from a surface of target 215. The optical measurements from spectrometer 245 may be supplied to a processing device (not shown), such as a conventional computer, for subsequent processing.

Consistent with the exemplary process of the present invention, target 215 may be shocked by impact of flyer 210, with the shock reaching the interface between target 215 and window 220. The radiation from the shocked surface of target 215 emits through window 220 and travels through optical fibers 235 to spectrometer 245. Once a steady state has been reached and measured on the surface of target 215 (steady state is reached in approximately 0.1 microseconds), pulsed light source 240 may be fired and radiation may be reflected off of the shocked surface of target 215. The sum of the emitted and the reflected radiation may be measured by spectrometer 245.

EXEMPLARY SPECTROMETER

Figure 3:
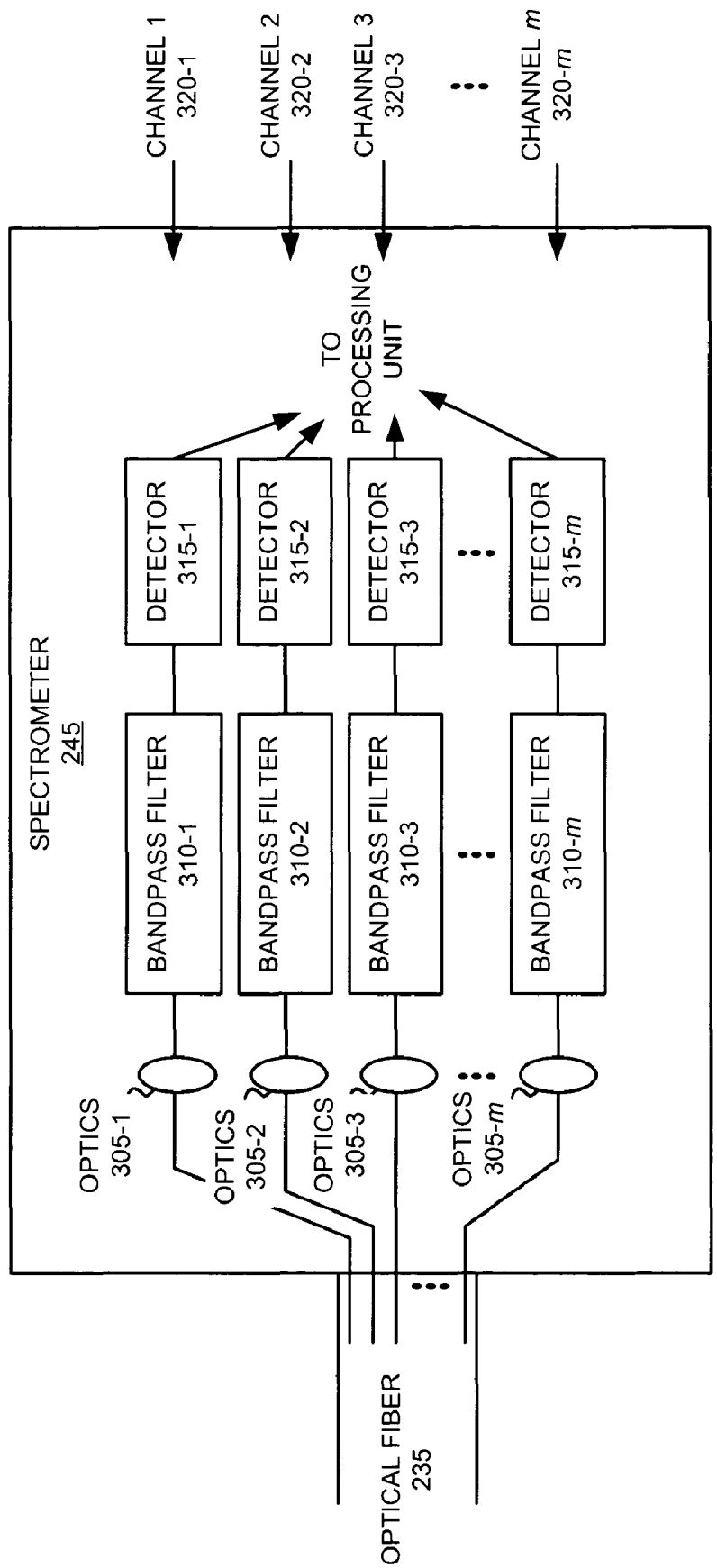
FIG. 3 illustrates exemplary components of the spectrometer of FIG. 2 consistent with the invention.

FIG. 3 illustrates an exemplary spectrometer 245 that may measure radiation emitted or reflected from a target surface consistent with the present invention. Spectrometer 245 may include multiple optics 305-1 through 305-$m$, multiple bandpass filters 310-1 through 310-$m$, and multiple detectors 315-1 through 315-$m$. Each optics 305, bandpass filter 310 and detector 315 may be associated with a given channel 320-1 through 320-$m$ (i.e., a given wavelength interval). For example, optics 305-1, bandpass filter 310-1 and detector 315-1 may be associated with channel 1 320-1. Each optics 305 may receive signals from optical fiber 235 and may include, for example, a lens. Each bandpass filter 310 may receive signals from optics 305 and pass only those signals within its bandpass region to a respective detector 315. Each detector 315 may convert the signals received from a respective bandpass filter 310 to an electrical signal that can be supplied to a processing unit, such as, for example, a personal computer (PC) for subsequent processing.

FIRST EXEMPLARY PROCESS FOR MEASURING EMISSIVITY AND TEMPERATURE OF A SURFACE

Figure 4:
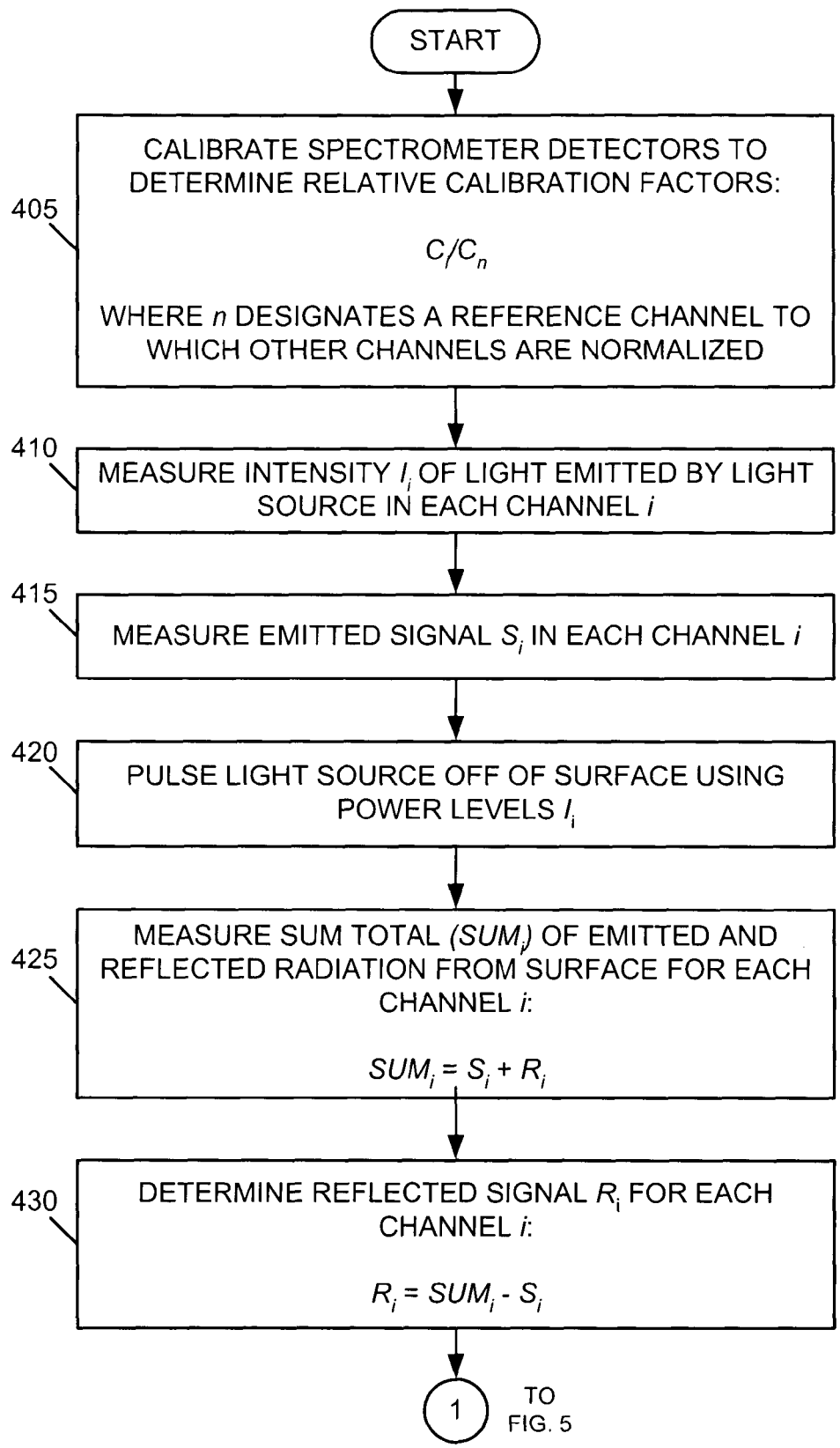
FIGS. 4–5 illustrate an exemplary process that utilizes the relative magnitude of the emitted light in each channel and the incident light spectrum measured in the same channels for measuring the emissivity and temperature of a surface.
Figure 5:
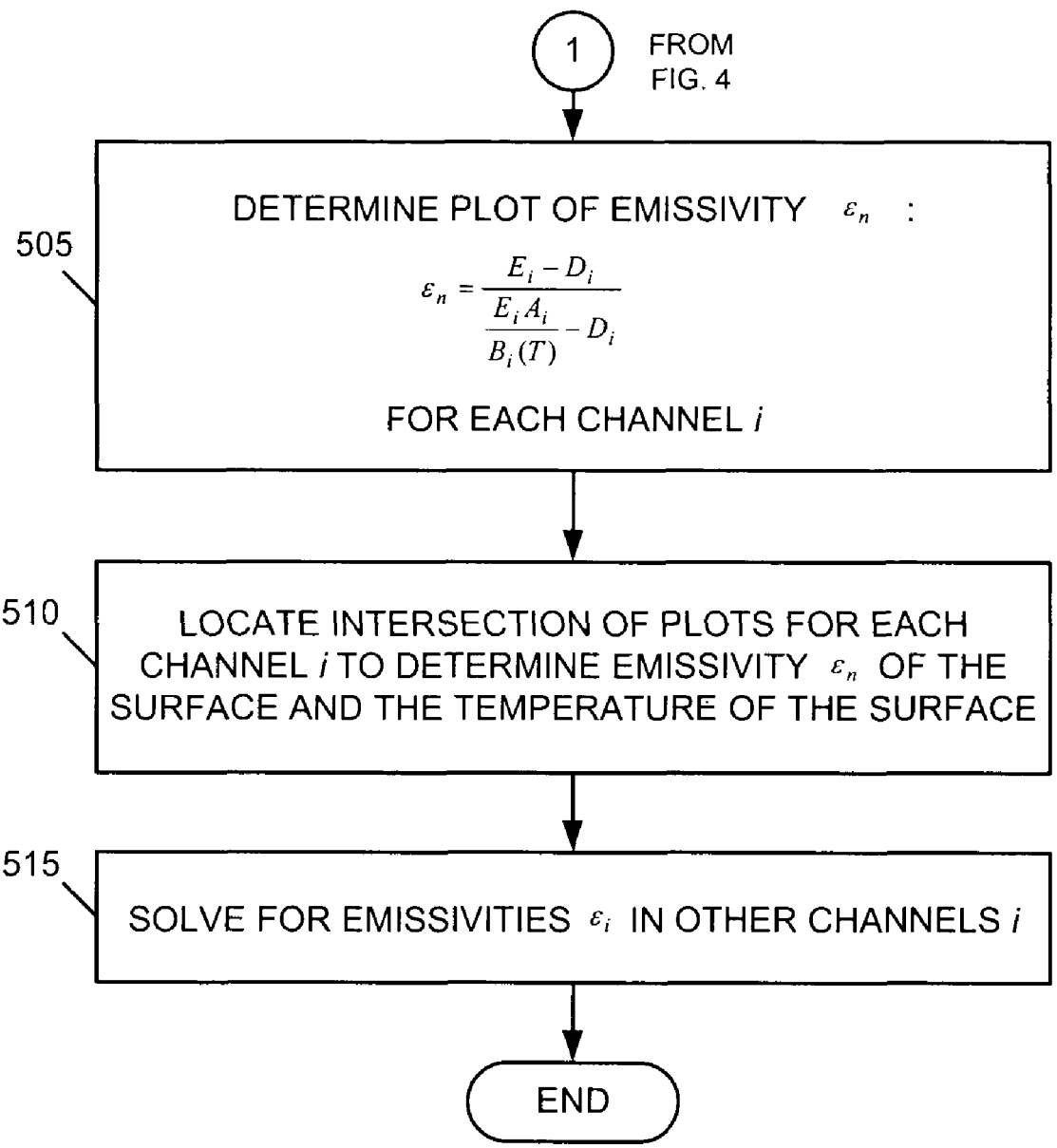

FIGS. 4–5 illustrate a first exemplary process for measuring the emissivity and temperature of a surface that utilizes relatives magnitudes of emitted light in each of several channels and the incident light spectrum measured in the same channels. In this first exemplary process, knowledge of the geometry of the surface and absolute determination of the emitted and reflected power is not required as long as the light is measured at the same point wherein the incident light originates. The exemplary process of FIGS. 4–5 uses the relative magnitude of the emitted light in each of the light detector 120 (or spectrometer 245) channels and the incident light spectrum measured in each of the light detector 120 (or spectrometer 245) channels to compute the channel emissivites and the surface temperature.

In accordance with this first exemplary process, the relation for the light emitted from surface 105 or target 215 is the following:

$$S_i = \epsilon_i F_i(T) K C_i \qquad \text{Eqn. (1)}$$

where
- $S_i$ is the surface emission signal in channel i;
- $\epsilon_i$ is the emissivity of the surface or target in the wavelength interval of channel i;
- $F_i$ is the known black body power in channel i as a function of temperature T;
- K is a geometry factor which is assumed to be independent of the wavelength channel; and
- $C_i$ is a sensor calibration factor for channel i.

The relation for the light reflected from surface 105 or target 215 is the following:

$$R_i = (1 - \epsilon_i) I_i H C_i \qquad \text{Eqn. (2)}$$

where
- $R_i$ is the signal corresponding to the reflected light from light source 115 or light source 240 in channel i;
- $I_i$ is the power of the light from light source 115 or light source 240 in channel i; and
- H is a geometry factor that may be assumed to be independent of the wavelength of the channel.

In Eqn. (2) above, it has been assumed that the reflectivity is one minus the emissivity for each channel. There are conditions relating to the angular independence of the emissivity that must be satisfied for this relation to be applicable.

To eliminate the geometry factors K and H, relative values may be used (i.e., the spectrum instead of absolute flux). Geometry factors K and H may be eliminated by choosing an arbitrary channel n and normalizing the equations. Typically the channel chosen for channel n is the one with good signal resolution for both the emitted and the reflected signal. Eqns. (1) and (2) become, when normalized to an arbitrary channel n for each channel i, the following:

$$A_i = e_i B_i(T) \qquad \text{Eqn. (3)}$$

$$D_i = E_i (1 - e_i \epsilon_n)/(1 - \epsilon_n) \qquad \text{Eqn. (4)}$$

where $e_i \epsilon_i / \epsilon_n$; \qquad Eqn. (5)

$$A_i = S_i C_n / S_n C_i \qquad \text{Eqn. (6)}$$

$$B_i = F_i / F_n \qquad \text{Eqn. (7)}$$

$$D_i = R_i C_n / R_n C_i; \text{ and} \qquad \text{Eqn. (8)}$$

$$E_i = I_i / I_n \qquad \text{Eqn. (9)}$$

The values of $A_i$, $D_i$, $E_i$ and the functional dependence of $B_i$ on T are known. Eqns. (3) and (4) may be solved for the emissivity $\epsilon_n$ as a function of the temperature T:

$$\varepsilon_n = \frac{E_i - D_i}{\frac{E_i A_i}{B_i(T)} - D_i} \qquad \text{Eqn. (10)}$$

The exemplary process may begin with the calibration of light detectors 120-1 through 120-N (or spectrometer 145 detectors 215-1 through 215-m) to determine relative calibration factors $C_i/C_n$, where n designates a reference channel to which all other channels are normalized [step 405]. The intensity $I_i$ of light emitted by light source 115 or 240 in each channel i may then be measured [act 410]. In exemplary system 200, subsequent to spectrometer calibration, flyer 210 may then be driven into a surface of target 215 using, for example, gas gun 205 to shock the surface of target 115. An emitted signal $S_i$ may be measured in each channel i associated with light detectors 120-1 through 120-N [step 415]. After measuring the emitted signal $S_i$ in each channel i, light source 115 or 240 may then be pulsed off of surface 105 or the shocked surface of target 215 using the measured power level $I_i$ for each channel i of light detectors 120-1 through 120-N [step 420]. During pulsing of light source 115 or 240 off of surface 105 or target 215, a sum total ($SUM_i$) of the emitted ($S_i$) and reflected ($R_i$) radiation from surface 105 or target 215 for each channel i may be measured [step 425]:

$$SUM_i = S_i + R_i \qquad \text{Eqn. (11)}$$

The reflected signal $R_i$ for each channel i may be determined [step 430] according to the following:

$$R_i = SUM_i - S_i \qquad \text{Eqn. (12)}$$

A plot of emissivity $\epsilon_n$ of the reference channel n for each channel i may then be determined [step 505] using the following relation (e.g., Eqn. (10)):

$$\varepsilon_n = \frac{E_i - D_i}{\frac{E_i A_i}{B_i(T)} - D_i}$$

where:

$$A_i = S_i C_n / S_n C_i$$

$$B_i = F_i / F_n$$

$$D_i = R_i C_n / R_n C_i; \text{ and}$$

$$E_i = I_i / I_n.$$

Figure 8:
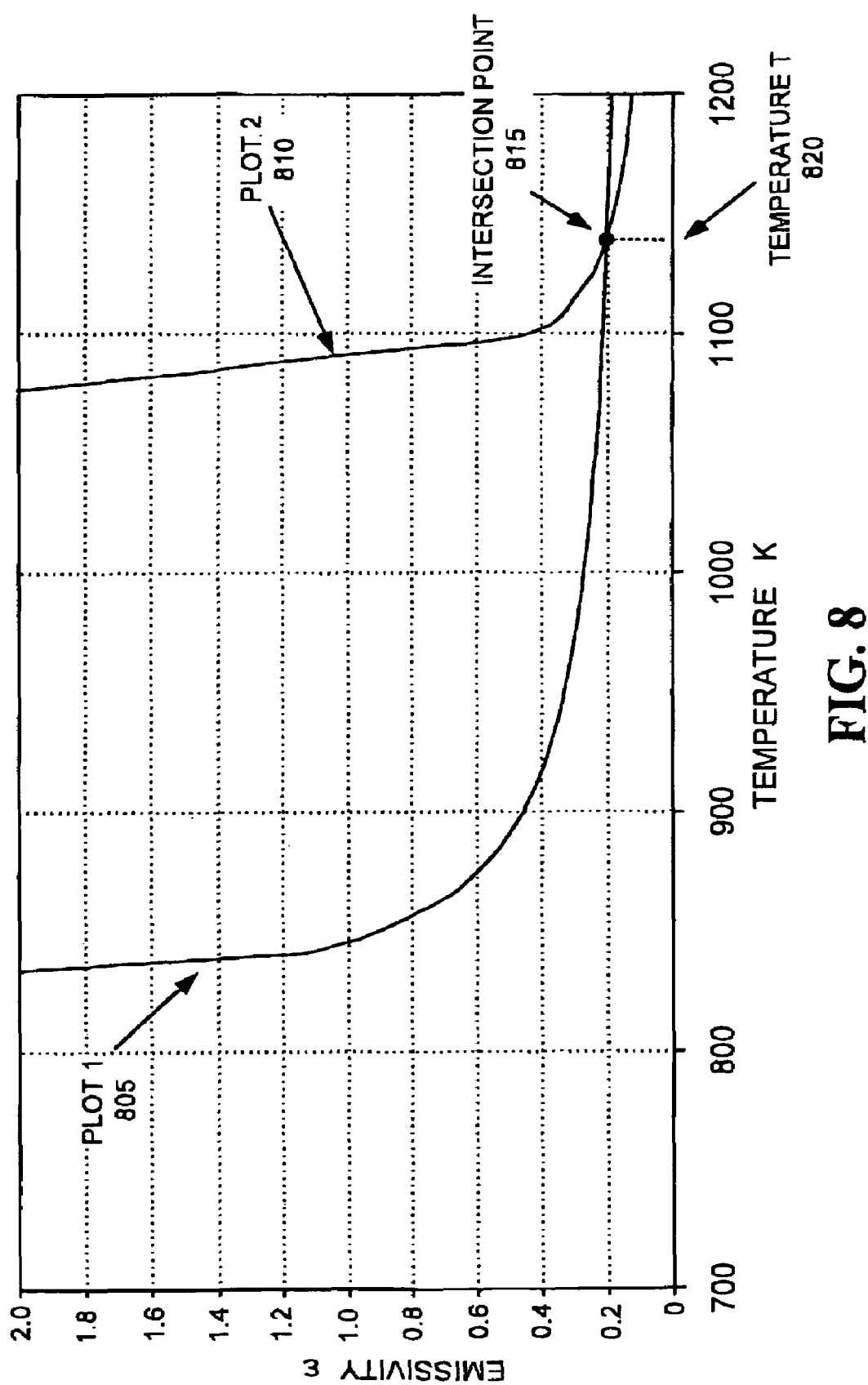
FIG. 8 illustrates exemplary plots of emissivity versus temperature that may be employed with the exemplary process of FIGS. 4–5 for determining the emissivity and temperature of a surface.

An intersection of the all the plots of emissivity $\epsilon_n$ versus temperature for each channel i may be located to determine the actual emissivity $\epsilon_n$ and the temperature T of surface 105 or target 215 [step 510]. For example, as shown in FIG. 8, plot 805 represents a plot of $\epsilon_n$ vs. T for channel 1. Plot 2 810 represents a plot of $\epsilon_n$ vs. T for channel 2. The intersection point 815, where plot 1 805 and plot 2 810 intersect, represents the solution for the emissivity and temperature of surface 105 or target 215. In the example shown, surface 105 or target 215 has an emissivity $\epsilon_n$ of 0.2 at a temperature (T) of 1140 K. The emissivities $\epsilon_i$ for all the other channels i may then be solved using the determined emissivity $\epsilon_n$ for channel n and Eqns. (3)–(9) [step 515].

SECOND EXEMPLARY PROCESS FOR MEASURING EMISSIVITY AND TEMPERATURE OF A TARGET SURFACE

Figure 6:
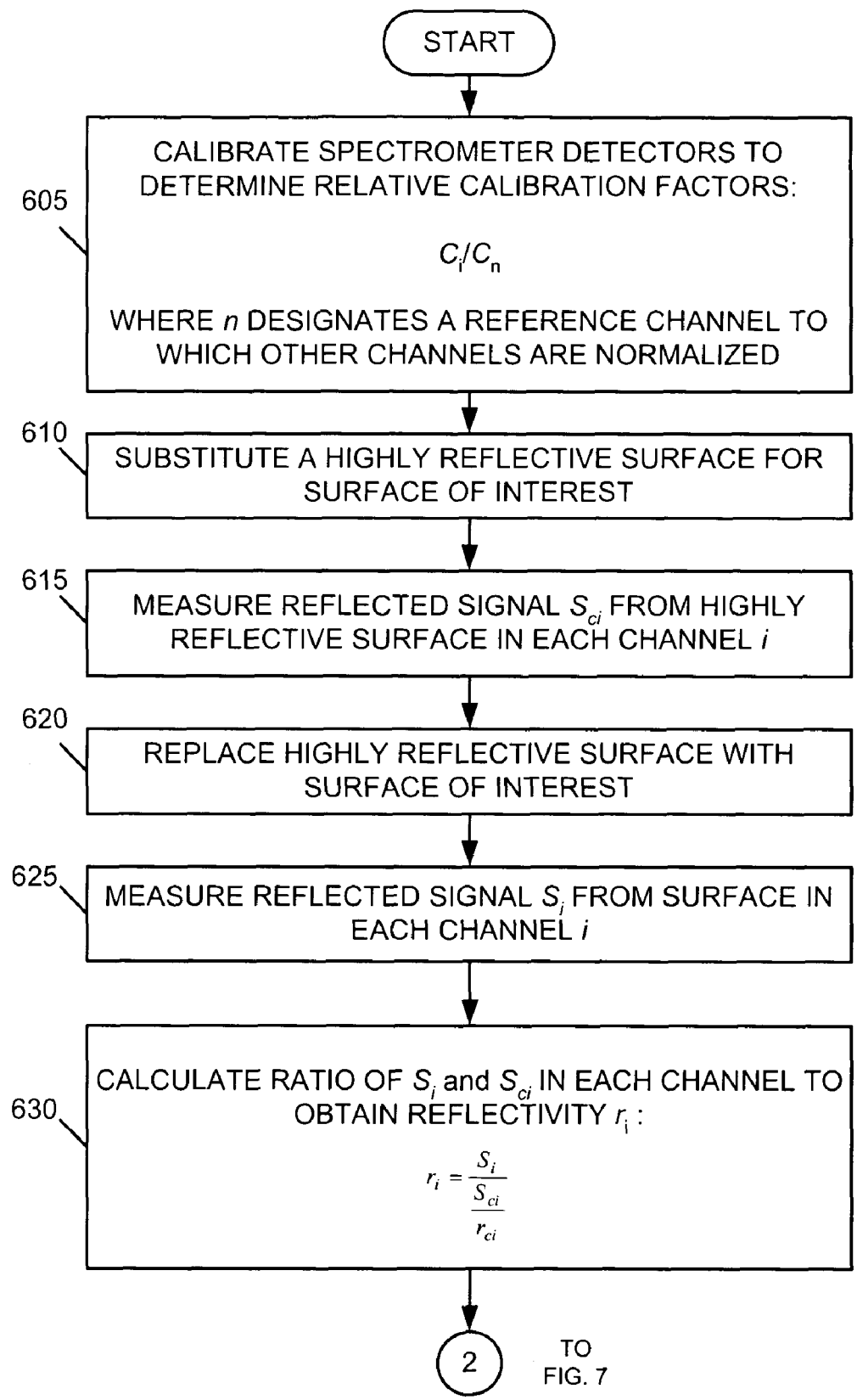
FIGS. 6–7 illustrate an exemplary process that utilizes a measurement of reflected power from a surface having a known reflectivity as a basis for determining the emissivity and temperature of a surface of interest.
Figure 7:
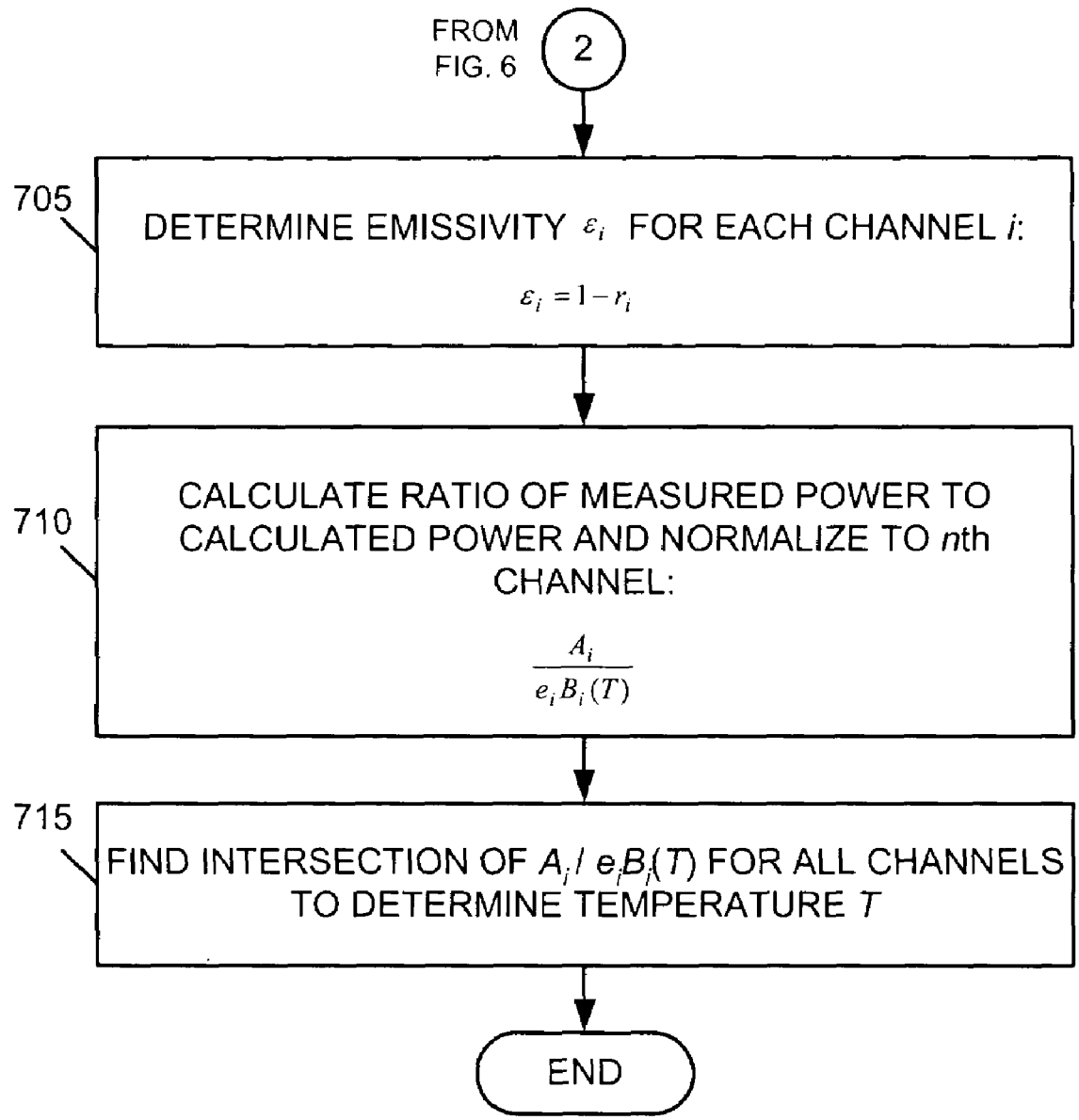

FIGS. 6–7 illustrate a second exemplary process that utilizes measurements of reflected power from a surface having a known reflectivity as a basis for determining the emissivity and temperature of a given surface. In this second exemplary process, a surface having a known reflectivity may be substituted for surface 105 or target 215 and a direct measurement of the reflected signal in each channel i from the substituted surface may be made. Surface 105 or target 215 may be substituted back into system 100 or 200, respectively, and a measurement of the reflected signal in each channel i from surface 105 or target 215 may be made. The reflectivity in each channel may be obtained by calculating the ratio of the measured reflected signals.

The exemplary process of FIGS. 6–7 may begin with the calibration of light detectors 120-1 through 120-N (or spectrometer 145 detectors 215-1 through 215-$m$) to determine relative calibration factors $C_i/C_n$, where n designates a reference channel to which all other channels are normalized [step 605]. A highly reflective surface, with a precisely know reflectivity $r_i$, may be substituted for the surface of interest (e.g., surface 105 or target 215 in systems 100 or 200, respectively) [step 610]. A reflected signal $S_{Ci}$ may be measured from the highly reflective surface in each channel i by pulsing light source 115 or 240 and measuring the reflected signal S1 using light detectors 120-1 through 120-N (or spectrometer 145) [act 615]. The highly reflective surface may then be replaced with the surface of interest (e.g.,, surface 105 or target 215) [step 620]. In the exemplary implementation of FIG. 2, flyer 210 may then be driven into target 215, using gas gun 205, to shock the surface of target 215. The reflected signal $S_i$ from the shocked target surface may be measured in each channel i [step 625]. The ratio of $S_i$ and $S_{ci}$ in each channel i may be calculated [step 630] to obtain the reflectivity $r_i$ according to the following relation:

$$r_i = \frac{S_i}{\frac{S_{ci}}{r_{ci}}} \quad \text{Eqn. (13)}$$

The emissivity $\epsilon_i$ for each channel i may be determined [step 705] according to the following:

$$\epsilon_i = 1 - r_i \quad \text{Eqn. (14)}$$

A ratio of measured power to calculated power may be calculated and normalized to a channel n for each channel i [step 710]

$$\frac{A_i}{e_i B_i(T)} \quad \text{Eqn. (15)}$$

Figure 9:
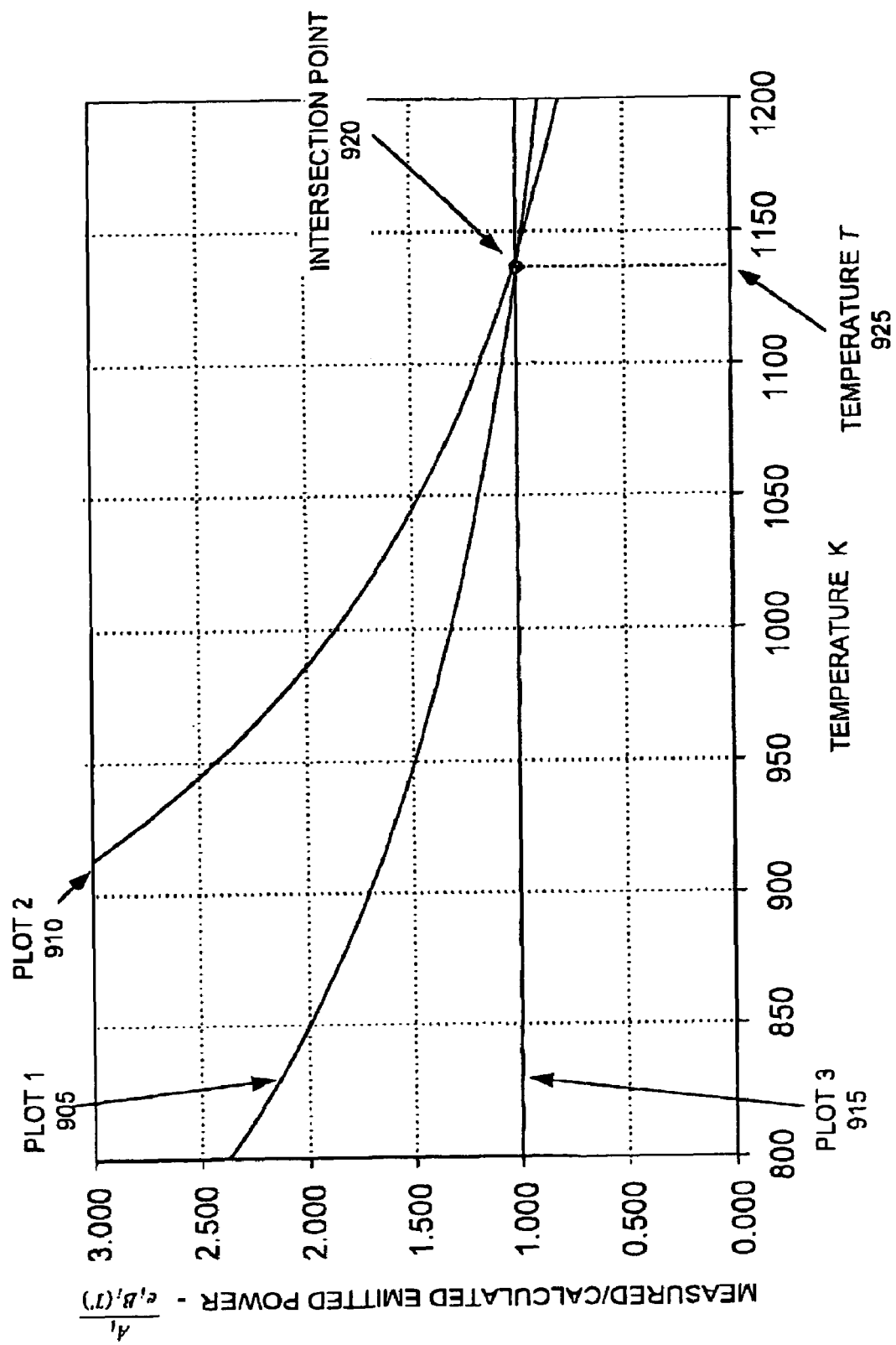
FIG. 9 illustrates exemplary plots of normalized ratios of measured to calculated emitted power as a function of temperature that may be employed with the exemplary process of FIGS. 6–7 for determining the temperature of a surface.

The intersection of the plots of $A_i/e_i B_i(T)$ for each channel i may be found to determine the target surface temperature T [step 715]. For example, as shown in FIG. 9, plot 1 905 represents a plot of the ratio of measured power to calculated power (normalized to channel n) for channel 1. Plot 2 910 represents a plot of the ratio of measured power to calculated power (normalized to channel n) for channel 2. Plot 3 915 represents a plot of the ratio of measured power to calculated power (normalized to channel n) for channel 3. Plot 1 905, plot 2 910 and plot 3 915 intersect at intersection point 920 at a temperature T 925 of 1140 K. Surface 105 or target 115, thus, is 1140 K in the example of FIG. 9.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in software and others in hardware, other configurations may be possible. While series of steps have been described with regard to FIGS. 4–7, the order of the steps may vary in other implementations consistent with the present invention. Also, non-dependent steps may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method of obtaining an emissivity and temperature of a surface of interest, comprising:
   substituting the surface of interest with a highly reflective surface having a known reflectivity ($r_{ci}$);
   measuring a reflected signal $S_{ci}$ from the highly reflective surface in each wavelength interval i of a plurality of wavelength intervals;
   replacing the highly reflective surface with the surface of interest;
   measuring a reflected signal $S_i$ from surface of interest in each wavelength interval i;
   obtaining a reflectivity $r_i$ for each wavelength interval i using the following relationship:

$$r_i = \frac{S_i}{\frac{S_{ci}}{r_{ci}}}$$

determining an emissivity ($\epsilon_i$) for each wavelength interval i according to the following relationship:

$\epsilon_i = 1 - r_i$ plotting, for each wavelength interval i, a ratio of measured power to calculated power normalized to an nth wavelength interval; and
   obtaining the temperature of the surface of interest based on the plots for each wavelength interval i.

2. The method of claim 1, wherein obtaining the temperature of the surface of interest comprises locating an intersection of the plots with one another.

3. The method of claim 1, further comprising:
   shocking the surface of interest prior to measuring a reflected signal $S_i$ from the surface of interest.

4. The method of claim 3, wherein shocking the surface comprises:
   driving a flyer into the surface of interest at a given velocity.

* * * * *